US012772096B2

(12) United States Patent
Dong

(10) Patent No.: US 12,772,096 B2
(45) Date of Patent: Oct. 20, 2026

(54) COMMUNICATION METHOD AND APPARATUS, AND ELECTRONIC DEVICE AND STORAGE MEDIUM

(71) Applicant: BEIJING XIAOMI MOBILE SOFTWARE CO., LTD., Beijing (CN)

(72) Inventor: Xiandong Dong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 193 days.

(21) Appl. No.: 18/837,771

(22) PCT Filed: Feb. 14, 2022

(86) PCT No.: PCT/CN2022/076205
§ 371 (c)(1),
(2) Date: Aug. 12, 2024

(87) PCT Pub. No.: WO2023/151077
PCT Pub. Date: Aug. 17, 2023

(65) Prior Publication Data

US 2025/0142390 A1 May 1, 2025

(51) Int. Cl.
*H04W 24/10* (2009.01)
*H04L 25/03* (2006.01)
*H04W 84/12* (2009.01)

(52) U.S. Cl.
CPC ....... *H04W 24/10* (2013.01); *H04L 25/03891* (2013.01); *H04W 84/12* (2013.01)

(58) Field of Classification Search
CPC .. H04W 24/10; H04W 84/12; H04L 25/03891
See application file for complete search history.

(56) References Cited

U.S. PATENT DOCUMENTS

| | | | | |
|---|---|---|---|---|
| 11,849,369 | B2 * | 12/2023 | Chen | H04W 4/027 |
| 12,114,357 | B2 * | 10/2024 | Lim | H04W 74/0808 |
| 2019/0349067 | A1 | 11/2019 | Huang et al. | |
| 2023/0388778 | A1 * | 11/2023 | Zhou | H04W 8/005 |
| 2024/0314590 | A1 * | 9/2024 | Zhou | H04W 24/02 |
| 2025/0113229 | A1 * | 4/2025 | Kim | H04W 24/08 |
| 2025/0159524 | A1 * | 5/2025 | Lim | H04L 5/00 |

FOREIGN PATENT DOCUMENTS

| | | | |
|---|---|---|---|
| CN | 111913159 | A | 11/2020 |
| CN | 112738758 | A | 4/2021 |
| WO | WO 2020228619 | A1 | 11/2020 |

OTHER PUBLICATIONS

Chinese Patent Application No. 202280000365.7, Office Action with English translation dated Mar. 30, 2025, 13 pages.

(Continued)

*Primary Examiner* — Schquita D Goodwin
(74) *Attorney, Agent, or Firm* — Cozen O'Connor

(57) ABSTRACT

A communication method includes: determining a sensing measurement report frame, in which the sensing measurement report frame comprises a control field, the control field comprises a first identification bit, and the first identification bit indicates a wireless local area network (WLAN) sensing measurement process corresponding to the sensing measurement report frame; and sending the sensing measurement report frame.

20 Claims, 3 Drawing Sheets

(56) References Cited

OTHER PUBLICATIONS

European Patent Application No. 22925439.6, Search and Opinion dated Feb. 27, 2025, 12 pages.
PCT/CN2022/076205 International Search Report dated Oct. 19, 2022, 2 pages.
Indian Patent Application No. 202447069337, Office Action dated Aug. 11, 2026, 9 pages.

* cited by examiner

COMMUNICATION METHOD AND APPARATUS, AND ELECTRONIC DEVICE AND STORAGE MEDIUM

CROSS-REFERENCE TO RELATED APPLICATION

This application is a U.S. national phase application of International Application No. PCT/CN2022/076205, filed on Feb. 14, 2022, the content of which is hereby incorporated by reference in its entirety.

TECHNICAL FIELD

Embodiments of the disclosure relate to a field of mobile communication technologies, more particularly to a communication method and apparatus, an electronic device and a storage medium.

BACKGROUND

With the rapid development of mobile communication technologies, a wireless technology such as (Wi-Fi™) has made great progress in a transmission rate, throughput and the like. Presently, research contents of the Wi-Fi technology include a bandwidth transmission with 320 Mhz, convergence and cooperation of multiple frequency bands and the like, and the main application scene of the Wi-Fi technology is, such as, video transmission, augmented reality (AR), virtual reality (VR) and the like.

The Wi-Fi technology studied presently may support a wireless local area network (WLAN) sensing technology, for example, in an application scene such as location discovery, proximity detection and presence detection in a dense environment (such as a home environment and an enterprise environment). In a WLAN sensing process, a sensing responder needs to feed back a measurement report to an initiator, so there is a need for a format of a measurement report frame.

SUMMARY

In an aspect, embodiments of the disclosure provide a communication method, applied to a sensing responder. The method includes:

- determining a sensing measurement report frame, in which the sensing measurement report frame includes a control field, the control field includes a first identification bit, and the first identification bit indicates a WLAN sensing measurement process corresponding to the sensing measurement report frame; and
- sending the sensing measurement report frame.

In another aspect, embodiments of the disclosure provide a communication method, applied to a sensing initiator. The method includes:

- receiving a sensing measurement report frame, in which the sensing measurement report frame includes a control field, the control field includes a first identification bit, and the first identification bit indicates a WLAN sensing measurement process corresponding to the sensing measurement report frame.

Embodiments of the disclosure also provide an electronic device, including: a memory, a processor, and a computer program stored in the memory and operated in the processor. The processor is configured to execute the computer program to implement one or more methods according to embodiments of the disclosure.

Additional aspects and advantages of embodiments of the disclosure will be set forth in part in the following description, which will become obvious from the following description, or may be learned by practice of the disclosure.

BRIEF DESCRIPTION OF THE DRAWINGS

In order to more clearly illustrate a technical solution in embodiments of the disclosure, accompanying drawings needed to use in the description of embodiments of the disclosure will be introduced clearly below. Apparently, the accompanying drawings described below are only a part of embodiments of the disclosure. For the ordinary skilled in the art, other drawings may further be obtained based on these accompanying drawings without creative work.

DETAILED DESCRIPTION

Figure 1:
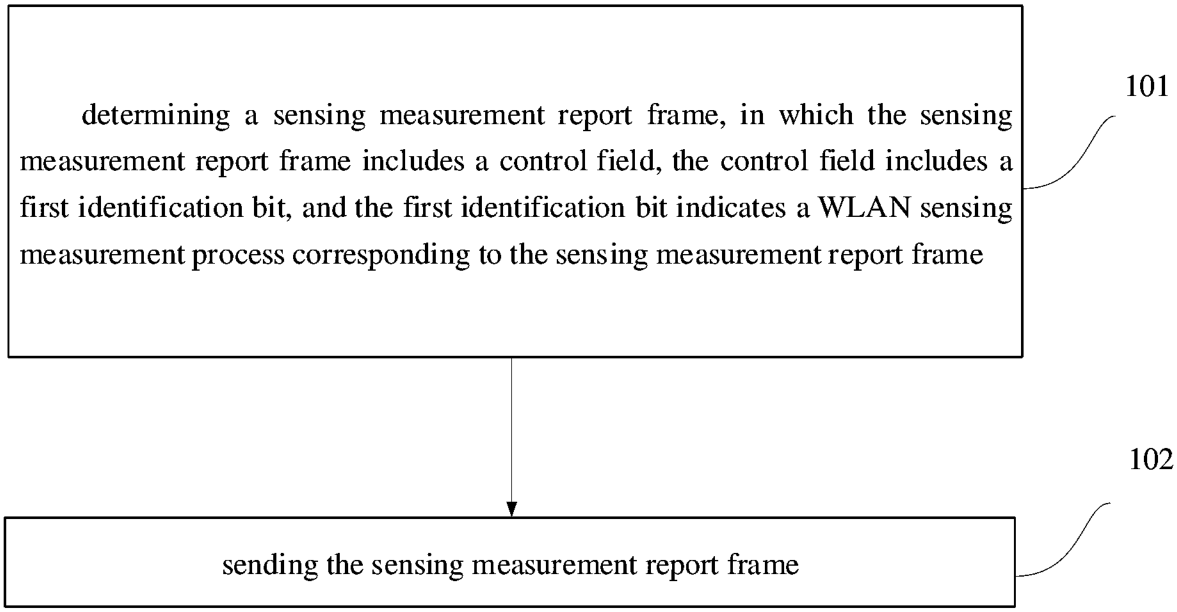
FIG. 1 is a flow chart illustrating a first example of a communication method according to an embodiment of the disclosure.

Terms "and/or" in embodiments of the disclosure, which describe an associated relationship of associated objects, may refer to three relationships. For example, A and/or B means that A exists alone, A and B exist at the same time, and B exists alone. A character "/" generally indicates that contextual objects are in an "or" relationship.

A term "a plurality" in embodiments of the disclosure refers to two or more, and other quantifiers are similar thereto.

Description will be made here in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with some aspects of the disclosure as recited in the appended claims.

Terms used herein in embodiments of the disclosure are only for the purpose of describing specific embodiments, but should not be construed to limit the disclosure. As used in the disclosure and the appended claims, "a/an", "said" and "the" in singular forms are intended to include plural forms, unless clearly indicated in the context otherwise. It should also be understood that, the term "and/or" used herein represents and contains any or all possible combinations of one or more associated listed items.

It should be understood that, although terms such as "first," "second" and "third" may be used in embodiments of the disclosure for describing various information, the information should not be limited by these terms. These terms are only used for distinguishing information of the same type from each other. For example, first information may also be referred to as second information, and similarly, the second information may also be referred to as the first information, without departing from the scope of the disclosure. As used herein, the term "if" may be construed to mean "when" or "upon" or "in response to determining" depending on the context.

Clear and complete description will be made below to the technical solution in embodiments of the disclosure with reference to the accompanying drawings in embodiments of the disclosure. Apparently, the described embodiments are only a part of embodiments of the disclosure, but not all the embodiments. Based on the embodiments in the disclosure, all other embodiments obtained by the ordinary skilled in the art without creative work belong to a protection scope of the disclosure.

Embodiments of the disclosure provide a communication method and apparatus, an electronic device and a storage medium, to provide a format of a measurement report frame in a WLAN sensing process.

The method and the apparatus are based on a same application concept. Since the principles of solving problems in the method and the apparatus are similar, embodiments of the method and embodiments of the apparatus may be referred to each other, the repeated contents are not elaborated herein.

As illustrated in FIG. 1, embodiments of the disclosure provide a communication method. Alternatively, the method may be applied to a network device. The method includes the following steps.

At block 101, a sensing measurement report frame is determined. The sensing measurement report frame includes a control field. The control field includes a first identification bit, and the first identification bit indicates a wireless local area network (WLAN) sensing measurement process corresponding to the sensing measurement report frame.

Figure 2:
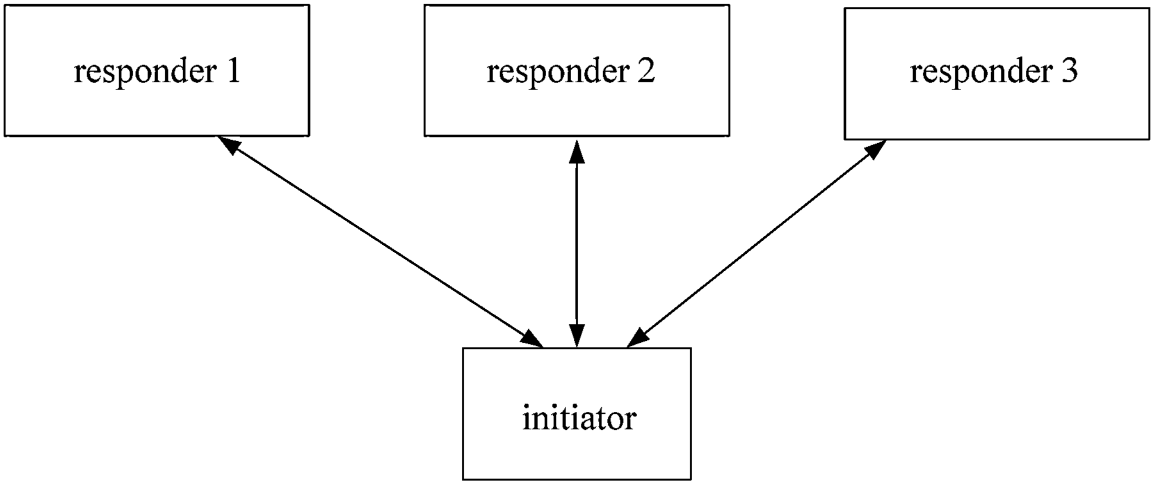
FIG. 2 is a schematic diagram illustrating a first example of a first example according to an embodiment of the disclosure.
Figure 3:
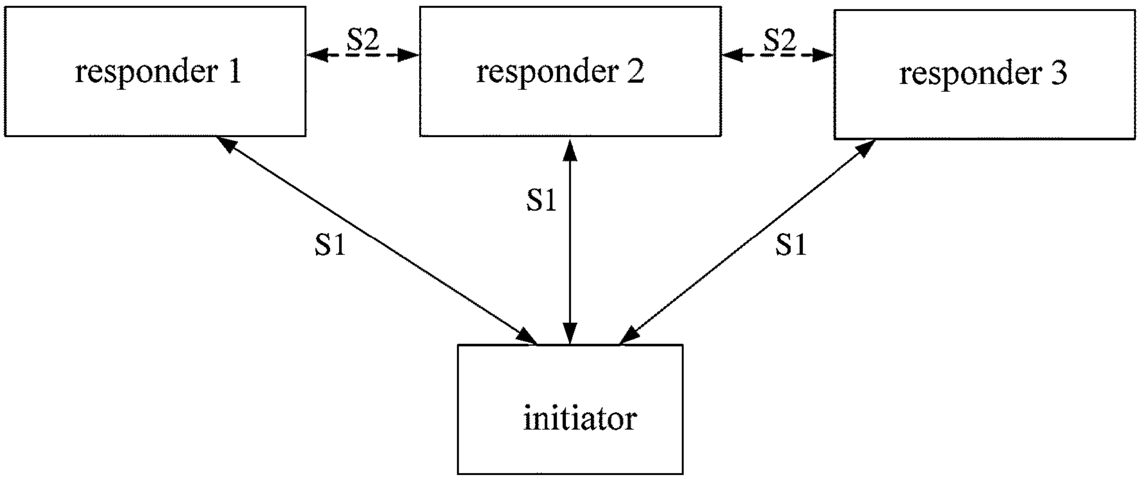
FIG. 3 is a schematic diagram illustrating a second example of a first example according to an embodiment of the disclosure.
Figure 4:
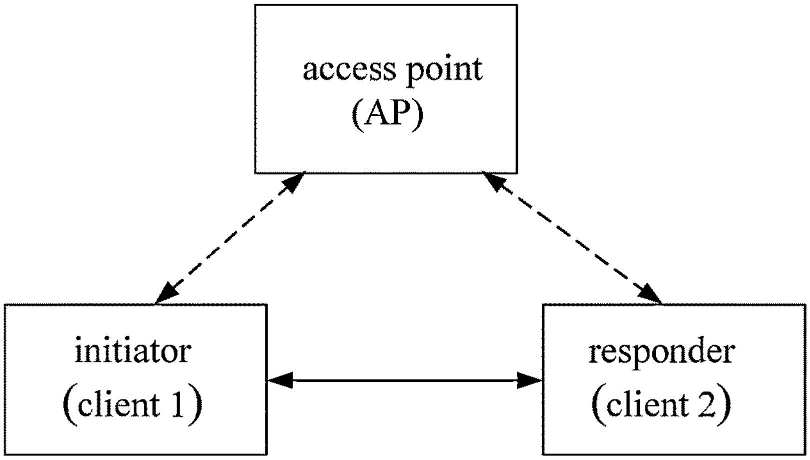
FIG. 4 is a schematic diagram illustrating a third example of a first example according to an embodiment of the disclosure.

As a first example, referring to FIG. 2 to FIG. 4, description is made firstly to an architecture of WLAN sensing and the WLAN sensing process to which the communication method according to embodiments of the disclosure is applied.

FIG. 2 illustrates an architectural schematic diagram of the WLAN sensing process. A sensing initiator (or initiator) initiates the WLAN sensing (for example, initiating a WLAN sensing session), and there may be multiple sensing responders (also called sensing receiver) or responders responding to the WLAN sensing, such as a responder 1, a responder 2 and a responder 3 illustrated in FIG. 2. When the sensing initiator initiates the WLAN sensing, multiple sensing responders associated or non-associated with the WLAN sensing may respond to the WLAN sensing.

Referring to FIG. 3, the sensing initiator and the sensing responder may communicate through a communication connection, such as a communication connection S1. The sensing responders communicate with each other through a communication connection S2.

Each sensing initiator may be a client. Each sensing responder (in this example, sensing responders 1 to 3) may be a station (STA) or an access point (AP). In addition, the STA and the AP may assume multiple roles in the WLAN sensing process. For example, in the WLAN sensing process, the STA may also act as the sensing initiator, and the sensing initiator may be a sensing transmitter, a sensing responder, or both, or neither. In the WLAN sensing process, the sensing responder may also be a sensing transmitter, a sensing responder or both.

As another architecture, as illustrated in FIG. 4, both the sensing initiator and the sensing responder may also be clients, and may communicate with each other by connecting to a same access point (AP). In FIG. 4, a client 1 is the sensing initiator, and a client 2 is the sensing responder.

In the WLAN sensing process, the sensing responder determines (or generates) the sensing measurement report frame. The sensing measurement report frame includes the control field, and fields in the control field are configured to explain parameter information required by the sensing measurement report frame.

In detail, the control field includes the first identification bit, and the first identification bit indicates the WLAN sensing measurement process corresponding to the sensing measurement report frame, that is, indicates a WLAN sensing measurement process to which the sensing measurement report frame reported by the sensing initiator belongs. For example, the first identification bit carries identification information of the WLAN sensing measurement process.

At block 102, the sensing measurement report frame is sent.

After the sensing responder determines the sensing measurement report frame, the sensing responder sends the sensing measurement report frame to the sensing initiator to improve the WLAN sensing measurement process.

In an alternative embodiment, the first identification bit includes a sensing measurement exchange identification (ID) included in the WLAN sensing measurement process. The WLAN sensing measurement process may include one or more sensing measurement exchanges (also called sensing measurement instance). In case that the WLAN sensing measurement process includes one sensing measurement exchange, a feedback mode of the sensing measurement report frame may be a timely feedback mode. In case that the WLAN sensing measurement process includes multiple sensing measurement exchanges, a feedback mode of the sensing measurement report frame may be a delay feedback mode. The first identification bit carries the sensing measurement exchange ID, such that the sensing initiator obtains the sensing measurement exchange corresponding to the sensing measurement report frame.

Further, the first identification bit also includes a sensing measurement setup identification (ID) included in the WLAN sensing measurement process.

The sensing measurement setup identification corresponds to the sensing measurement exchange identification. Alternatively, each sensing measurement setup ID may correspond to one or more sensing measurement exchange IDs.

In an alternative embodiment, the control field includes a sounding dialog token number subfield.

The first identification bit is carried in the sounding dialog token number subfield. Alternatively, the sensing measurement setup ID and the corresponding sending measurement exchange ID mentioned above may be carried in the sounding dialog token number subfield.

Alternatively, in embodiments of the disclosure, the control field also includes at least one of following subfields A to D.

Subfield A: a bandwidth (BW) parameter subfield.

In detail, the BW parameter subfield identifies a BW parameter corresponding to the sensing measurement report frame, that is, the sensing measurement report frame is a result of sensing measurement in a bandwidth indicated by the BW parameter. For example, when bandwidths with 20 MHz, 40 MHz, 80 MHz, 160 MHz and 320 MHz are identified, three bits may be employed to identify the above BW parameters.

Subfield B: a format subfield or a type subfield. The control field may include the format subfield or the type subfield. A single user (SU) type or a multiple user (MU) type may be indicated in the format subfield or the type subfield. The SU type identifies the WLAN sensing measurement process as a non-triggered based (Non-TB) sounding, such as a DL sounding process. The MU type identifies the WLAN sensing measurement process as a triggering-based (TB) sounding, such as an UL sounding process. It may be understood that, in case that the format subfield or the type subfield indicates the SU type, the control field may not include an RU index subfield, that is, a second index information subfield described below.

Subfield C: a first index information subfield for the number of spatial streams (NSS) or the number of spatial stream total (NST). The first index information subfield is configured to identify the number of NSS or NST.

Subfield D: a byte information bit subfield. Byte information is byte information of feedback information (measurement report field) in the sensing measurement report frame, and the feedback information is a sensing measurement result. The byte information bit subfield is configured to indicate a matrix size of the measurement report field, and the matrix size is, such as, 4×2 or 2×2.

Alternatively, in embodiments of the disclosure, in case that the format subfield or the type subfield indicates that the WLAN sensing measurement process is applied to multiple users, the control field also includes a second index information subfield for a resource unit (RU), which is configured to identify a resource unit (RU) or a multi-resource unit (MRU) employed by the sensing responder under detection of a null data packet announcement, (NDPA). The second index information may be on basis of 26-tone.

Alternatively, in embodiments of the disclosure, the control field also includes a remaining report segment subfield.

The remaining report segment subfield indicates a measurement report result to be transmitted, which identifies that the transmitted measurement report result may also include other parts to be transmitted subsequently.

In an alternative embodiment, the sensing measurement report frame is an action frame.

Alternatively, the action frame includes an action field.

The action includes a second identification bit or a third identification bit.

The second identification bit indicates that the action frame is a measurement report frame (sensing measurement report frame). For example, one value in the action field is configured to identify that the action frame is the measurement report frame.

The third identification bit indicates that the action frame is a Non-TB measurement report frame or a TB measurement report frame. For example, two values in the action field are configured to identify that the sensing measurement report frame is the Non-TB measurement report frame or the TB-based measurement report frame. It may be understood that, in case that the third identification bit is included in the action field, the above subfield B may not be included in the control field.

In embodiments of the disclosure, the sensing responder determines and sends the sensing measurement report frame. The sensing measurement report frame includes the control field, and the control field includes the first identification bit. The first identification bit indicates the WLAN sensing measurement process corresponding to the sensing measurement report frame. Embodiments of the disclosure provide the format of the measurement report frame in the WLAN sensing process, to improve the WLAN sensing measurement process.

Figure 5:
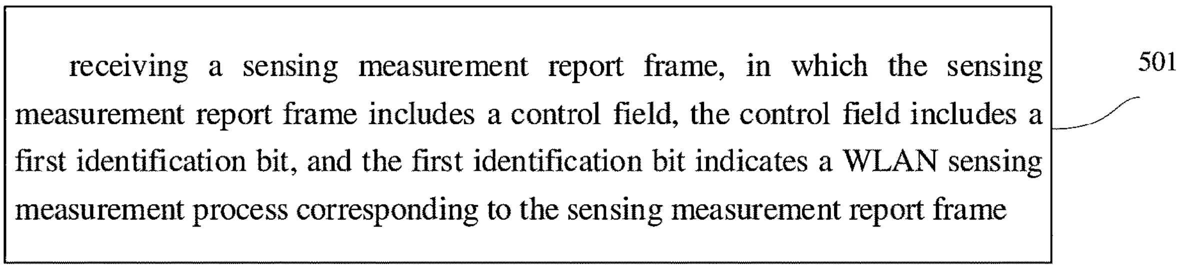
FIG. 5 is a flow chart illustrating a second example of a communication method according to an embodiment of the disclosure.

As illustrated in FIG. 5, embodiments of the disclosure further provide a communication method, applied to a sensing initiator. The method includes the following steps.

At block 501, a sensing measurement report frame is received. The sensing measurement report frame includes a control field. The control field includes a first identification bit. The first identification bit indicates a WLAN sensing measurement process corresponding to the sensing measurement report frame.

As a first example, referring to FIG. 2 to FIG. 4, description is made firstly to an architecture of WLAN sensing and the WLAN sensing process to which the communication method according to embodiments of the disclosure is applied. For details, please refer to the above embodiment, which is not elaborated herein.

In the WLAN sensing process, the sensing responder determines (or generates) the sensing measurement report frame, and sends the sensing measurement report frame to the sensing initiator, to improve the WLAN sensing measurement process. The sensing measurement report frame includes the control field, and fields in the control field are configured to explain parameter information required by the sensing measurement report frame.

In detail, the control field includes the first identification bit, and the first identification bit indicates the WLAN sensing measurement process corresponding to the sensing measurement report frame, that is, indicates a WLAN sensing measurement process to which the sensing measurement report frame reported by the sensing initiator belongs. For example, the first identification bit carries identification information of the WLAN sensing measurement process.

In an alternative embodiment, the first identification bit includes a sensing measurement exchange identification (ID) included in the WLAN sensing measurement process. The WLAN sensing measurement process may include one or more sensing measurement exchanges. In case that the WLAN sensing measurement process includes one sensing measurement exchange, a feedback mode of the sensing measurement report frame may be a timely feedback mode. In case that the WLAN sensing measurement process includes multiple sensing measurement exchanges, a feedback mode of the sensing measurement report frame may be a delay feedback mode. The first identification bit carries the sensing measurement exchange ID, such that the sensing initiator obtains the sensing measurement exchange corresponding to the sensing measurement report frame.

Further, the first identification bit also includes a sensing measurement setup identification (ID) included in the WLAN sensing measurement process.

The sensing measurement setup identification corresponds to the sensing measurement exchange identification. Alternatively, each sensing measurement setup ID may correspond to one or more sensing measurement exchange IDs.

In an alternative embodiment, the control field includes a sounding dialog token number subfield.

The first identification bit is carried in the sounding dialog token number subfield. Alternatively, the sensing measurement setup ID and the corresponding sending measurement exchange ID mentioned above may be carried in the sounding dialog token number subfield.

Alternatively, in embodiments of the disclosure, the control field also includes at least one of following subfields A to D.

Subfield A: a bandwidth (BW) parameter subfield.

In detail, the BW parameter subfield identifies a BW parameter corresponding to the sensing measurement report frame, that is, the sensing measurement report frame is a result of sensing measurement in a bandwidth indicated by the BW parameter. For example, when bandwidths with 20 MHz, 40 MHz, 80 MHz, 160 MHz and 320 MHz are identified, three bits may be employed to identify the above BW parameters.

Subfield B: a format subfield or a type subfield. The control field may include the format subfield or the type subfield. A single user (SU) type or a multiple user (MU) type may be indicated in the format subfield or the type subfield. The SU type identifies the WLAN sensing measurement process as a non-triggered based (Non-TB) sounding, such as a DL sounding process. The MU type identifies the WLAN sensing measurement process as a triggering-based (TB) sounding, such as an UL sounding process. It may be understood that, in case that the format subfield or the type subfield indicates the SU type, the control field may not include an RU index subfield, that is, a second index information subfield described below.

Subfield C: a first index information subfield for the number of spatial streams (NSS) or the number of spatial stream total (NST). The first index information subfield is configured to identify the number of NSS or NST.

Subfield D: a byte information bit subfield. Byte information is byte information of feedback information (measurement report field) in the sensing measurement report frame, and the feedback information is a sensing measurement result. The byte information bit subfield is configured to indicate a matrix size of the measurement report field, and the matrix size is, such as, 4×2 or 2×2.

Alternatively, in embodiments of the disclosure, in case that the format subfield or the type subfield indicates that the WLAN sensing measurement process is applied to multiple users, the control field also includes a second index information subfield for a resource unit (RU), which is configured to identify a resource unit (RU) or a multi-resource unit (MRU) employed by the sensing responder under detection of a null data packet announcement, (NDPA). The second index information may be on basis of 26-tone.

Alternatively, in embodiments of the disclosure, the control field also includes a remaining report segment subfield.

The remaining report segment subfield indicates a measurement report result to be transmitted, which identifies that the transmitted measurement report result may also include other parts to be transmitted subsequently.

In an alternative embodiment, the sensing measurement report frame is an action frame.

Alternatively, the action frame includes an action field.

The action includes a second identification bit or a third identification bit.

The second identification bit indicates that the action frame is a measurement report frame (sensing measurement report frame). For example, one value in the action field is configured to identify that the action frame is the measurement report frame.

The third identification bit indicates that the action frame is a Non-TB measurement report frame or a TB measurement report frame. For example, two values in the action field are configured to identify that the sensing measurement report frame is the Non-TB measurement report frame or the TB-based measurement report frame. It may be understood that, in case that the third identification bit is included in the action field, the above subfield B may not be included in the control field.

In embodiments of the disclosure, the sensing initiator receives the sensing measurement report frame. The sensing measurement report frame includes the control field, and the control field includes the first identification bit. The first identification bit indicates the WLAN sensing measurement process corresponding to the sensing measurement report frame. Embodiments of the disclosure provide the format of the measurement report frame in the WLAN sensing process, to improve the WLAN sensing measurement process.

Figure 6:
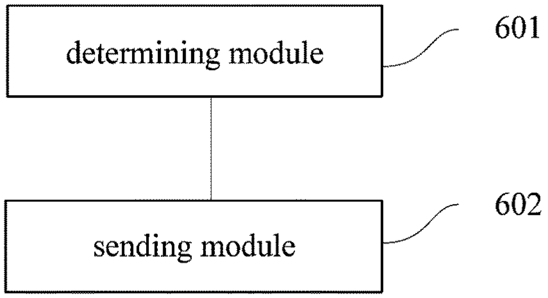
FIG. 6 is a block diagram illustrating a first example of a communication device according to an embodiment of the disclosure.

Based on a same principle as the method according to embodiments of the disclosure, embodiments of the disclosure also provide a network device. The network device is a sensing responder. As illustrated in FIG. 6, the network device includes:

a determining module 601, configured to determine a sensing measurement report frame, in which the sensing measurement report frame includes a control field, the control field includes a first identification bit, and the first identification bit indicates a WLAN sensing measurement process corresponding to the sensing measurement report frame; and a sending module 602, configured to send the sensing measurement report frame.

Alternatively, in embodiments of the disclosure, the first identification bit includes a sensing measurement exchange identification included in the WLAN sensing measurement process.

Alternatively, in embodiments of the disclosure, the first identification bit further includes a sensing measurement setup identification included in the WLAN sensing measurement process.

The sensing measurement setup identification corresponds to the sensing measurement exchange identification.

Alternatively, in embodiments of the disclosure, the control field includes a sounding dialog token number subfield.

The first identification bit is carried in the sounding dialog token number subfield.

Alternatively, in embodiments of the disclosure, the control field further includes at least one of:

a bandwidth (BW) parameter subfield, a format subfield or a type subfield, a first index information subfield for a number of spatial streams (NSS) or a number of spatial stream total (NST), or a byte information bit subfield.

Alternatively, in embodiments of the disclosure, in case that the format subfield or the type subfield indicates that the WLAN sensing measurement process is applied to multiple users, the control field further includes a second index information subfield for a resource unit (RU).

Alternatively, in embodiments of the disclosure, the control field further includes a remaining report segment subfield.

The remaining report segment subfield indicates a measurement report result to be transmitted.

Alternatively, in embodiments of the disclosure, the sensing measurement report frame is an action frame.

Alternatively, in embodiments of the disclosure, the action frame includes an action field.

The action field includes a second identification bit or a third identification bit.

The second identification bit indicates that the action frame is a measurement report frame.

The third identification bit indicates that the action frame is a Non-TB measurement report frame or a TB measurement report frame.

With the network device according to embodiments of the disclosure, the determining module 601 is configured to determine the sensing measurement report frame, and the sending module 602 is configured to send the sensing measurement report frame. The sensing measurement report frame includes the control field. The control field includes the first identification bit, and the first identification bit indicates the WLAN sensing measurement process corresponding to the sensing measurement report frame.

Embodiments of the disclosure further provide a communication apparatus, applied to a sensing responder. The communication apparatus includes:

- a report frame determining module, configured to determine a sensing measurement report frame, in which the sensing measurement report frame includes a control field, the control field includes a first identification bit, and the first identification bit indicates a WLAN sensing measurement process corresponding to the sensing measurement report frame; and
- a report frame sending module, configured to send the sensing measurement report frame.

The communication apparatus also includes other modules of the network device in the above embodiments, which are not elaborated herein.

Figure 7:
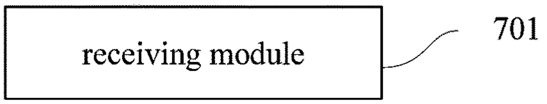
FIG. 7 is a block diagram illustrating a second example of a communication device according to an embodiment of the disclosure.

Referring to FIG. 7, embodiments of the disclosure also provide a network device. The network device is a sensing initiator. The network device includes:

- a receiving module 701, configured to receive a sensing measurement report frame, in which the sensing measurement report frame includes a control field, the control field includes a first identification bit, and the first identification bit indicates a WLAN sensing measurement process corresponding to the sensing measurement report frame.

Alternatively, in embodiments of the disclosure, the first identification bit includes a sensing measurement exchange identification included in the WLAN sensing measurement process.

Alternatively, in embodiments of the disclosure, the first identification bit further includes a sensing measurement setup identification included in the WLAN sensing measurement process.

The sensing measurement setup identification corresponds to the sensing measurement exchange identification.

Alternatively, in embodiments of the disclosure, the control field includes a sounding dialog token number subfield.

The first identification bit is carried in the sounding dialog token number subfield.

Alternatively, in embodiments of the disclosure, the control field further includes at least one of:

- a BW parameter subfield, a format subfield or a type subfield, a first index information subfield of a number of NSS or a number of NST, or a byte information subfield.

Alternatively, in embodiments of the disclosure, in case that the format subfield or the type subfield indicates that the WLAN sensing measurement process is applied to multiple users, the control field further includes a second index information subfield for a resource unit (RU).

Alternatively, in embodiments of the disclosure, the control field further includes a remaining report segment subfield.

The remaining report segment subfield indicates a measurement report result to be transmitted.

Alternatively, in embodiments of the disclosure, the sensing measurement report frame is an action frame.

Alternatively, in embodiments of the disclosure, the action frame includes an action field.

The action field includes a second identification bit or a third identification bit.

The second identification bit indicates that the action frame is a measurement report frame.

The third identification bit indicates that the action frame is a Non-TB measurement report frame or a TB measurement report frame.

In embodiments of the disclosure, the receiving module 701 is configured to receive the sensing measurement report frame. The sensing measurement report frame includes the control field. The control field includes the first identification bit, and the first identification bit indicates the WLAN sensing measurement process corresponding to the sensing measurement report frame.

Embodiments of the disclosure further provide a communication apparatus, applied to a sensing initiator. The communication apparatus includes:

- a report frame receiving module, configured to receive a sensing measurement report frame, in which the sensing measurement report frame includes a control field, the control field includes a first identification bit, and the first identification bit indicates a WLAN sensing measurement process corresponding to the sensing measurement report frame.

The communication apparatus also includes other modules of the network device in the above embodiments, which are not elaborated herein.

Figure 8:
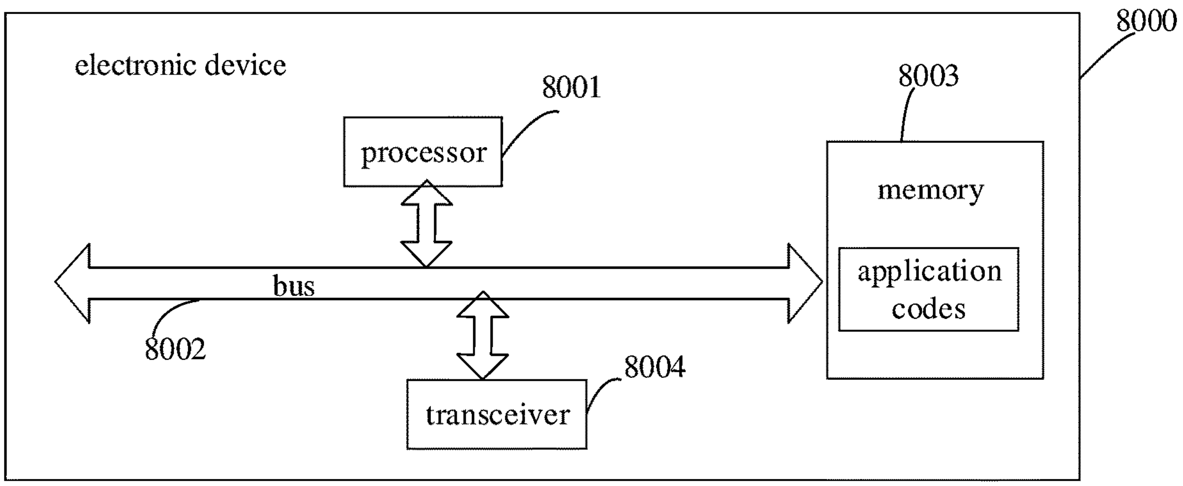
FIG. 8 is a block diagram illustrating an electronic device according to an embodiment of the disclosure.

In an alternative embodiment, embodiments of the disclosure also provide an electronic device. As illustrated in FIG. 8, the electronic device 8000 illustrated in FIG. 8 may be a server, including a processor 8001 and a memory 8003. The processor 8001 and the memory 8003 are connected, for example, through a bus 8002. Alternatively, the electronic device 8000 may further include a transceiver 8004. It should be noted that, there may be more than one transceiver 8004 in a practical application, and a structure of the electronic device 8000 does not constitute a limitation to embodiments of the disclosure.

The processor 8001 may be a central processing unit (CPU), a general processor, a digital signal processor (DSP), an application specific integrated circuit (ASIC), a field programmable gate array (FPGA), other programmable logic devices, transistor logic devices, hardware components or any combination thereof, which may implement or perform various exemplary logical blocks, modules, and circuits described in connection with the disclosure. The processor 8001 may also be a combination for implementing a computing function, for example, including a combination of one or more microprocessors, a combination of a DSP and a microprocessor, etc.

The bus 8002 may include a path to transfer information between the above components. The bus 8002 may be a peripheral component interconnect (PCI) bus or an extended industry standard architecture (EISA) bus. The bus 8002 may be classified into an address bus, a data bus, a control bus, etc. For convenience of representation, the bus is represented by only one thick line in FIG. 8, but it does not mean that there is only one bus or one type of bus.

The memory 8003 may be a read only memory (ROM) or other types of static storage devices that may store static information and instructions, a random access memory (RAM) or other types of dynamic storage devices that may store information and instructions. The memory 8003 may also be an electrically erasable programmable read only memory (EEPROM), a compact disc read only memory (CD-ROM) or other optical storage, an optical storage (including a compact disc, a laser disc, an optical disc, a digital versatile disc, a Blu-ray disc, etc.), a magnetic storage medium or other magnetic storage device, or any other medium that may be configured to carry or store desired program codes in the form of instructions or data structures and may be accessed by a computer, but is not limited thereto.

The memory 8003 is configured to store application codes for executing the technical solution of the disclosure, and the execution is controlled by the processor 8001. The processor 8001 is configured to execute the application codes stored in the memory 8003, to implement the contents illustrated in the above method embodiments.

The electronic device includes, but is not limited to, a mobile terminal such as a mobile phone, a notebook computer, a digital broadcast receiver, a personal digital assistant (PDA), a tablet, a portable multimedia player (PMP), a vehicle-mounted terminal (such as a vehicle-mounted navigation terminal), and a fixed terminal such as a digital TV and a desktop computer. The electronic device illustrated in FIG. 8 is only an example, and should not bring any limitation to a function and an application scope of embodiments of the disclosure.

The server according to the disclosure may be an independent physical server, a server cluster or a distributed system composed of multiple physical servers, and may also be a cloud server that provides a basic cloud computing service such as a cloud service, a cloud database, cloud computing, a cloud function, cloud storage, a network service, cloud communication, a middleware service, a domain name service, a security service, a CDN, big data and an artificial intelligence platform. The terminal may be a smart phone, a tablet, a notebook computer, a desktop computer, a smart speaker, a smart watch, etc., but it is not limited thereto. The terminal and the server may be directly or indirectly connected through wired or wireless communication, and the disclosure is not limited thereto.

Embodiments of the disclosure provide a computer-readable storage medium having a computer program stored thereon. When the computer program is run on a computer, the computer is caused to execute corresponding content in the above method embodiments.

It should be understood that, although steps in the flow chart of the accompanying drawings are illustrated in sequence as indicated by arrows, these steps are not necessarily executed in sequence as indicated by the arrows. Unless explicitly stated herein, the execution of these steps is not strictly limited in order, and these steps may be executed in other orders. Moreover, at least a part of the steps in the flow chart of the accompanying drawings may include multiple sub-steps or stages. The multiple sub-steps or stages may not necessarily be completed at the same time, but may be executed at different times, and the execution order of the multiple sub-steps or stages may not necessarily be sequential, but may be executed alternately or alternatively with other steps or at least a part of sub-steps or stages of other steps.

It should be noted that, the computer readable storage medium of the disclosure may be a computer readable signal medium or a computer readable storage medium, or a combination thereof. The computer readable storage medium may be, for example, but not limited to, an electronic, magnetic, optical, electromagnetic, infrared, or semiconductor system, apparatus, or device, or any suitable combination of the foregoing. More specific examples of the computer readable storage medium may include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical memory device, a magnetic memory device, or any of the above appropriate combinations. In the disclosure, the computer readable storage medium may be any tangible medium that contains or stores a program. The program can be used by or in conjunction with an instruction execution system, apparatus or device. In the disclosure, a computer readable signal medium may include a data signal transmitted in the baseband or as part of a carrier, in which carries computer readable program codes. The data signal transmitted may employ multiple forms, including but not limited to an electromagnetic signal, a light signal or any suitable combination thereof. The computer readable signal medium may further be any computer readable medium other than the computer readable storage medium. The computer readable medium may send, broadcast or transmit programs configured to use or use in combination by an instruction executing system, an apparatus or a device. The program codes included in the computer readable medium may be transmitted by any appropriate medium, including but not limited to wireless, wired, cable, RF (Radio Frequency), etc., or any suitable combination of the foregoing.

The computer readable medium may be included in the electronic device, or may exist alone without being assembled into the electronic device.

The computer readable medium carries one or more programs. When the one or more programs are executed by the electronic device, the electronic device is caused to execute the method illustrated in the above embodiments.

According to an aspect of the disclosure, there is provided a computer program product or computer program. The computer program product or computer program includes computer instructions stored in the computer readable storage medium. A processor of a computer device reads the computer instructions from the computer readable storage medium, and the processor executes the computer instructions, such that the computer device performs the methods according to various alternative implementations described above.

Computer program codes for executing the operation of the disclosure may be programmed using one or more program languages or the combination thereof. The program languages include object-oriented programming languages, such as Java, Smalltalk, C++, further include conventional procedural programming languages, such as the C programming language or similar programming languages. The computer readable program code may execute entirely on the computer of the user, partly on the computer of the user, as a stand-alone software package, partly on the computer of the user and partly on a remote computer, or entirely on the remote computer or server. In a case of involving a remote computer, the remote computer may be connected to the computer of the user through any type of network, including a local area network (LAN) or a wide area network (WAN), or the connection may be made to an external computer (for example, through the Internet using an Internet service provider).

The flow charts and the block diagrams in the accompanying drawings illustrate the architecture, functions and operations of possible implementations of systems, methods and computer program products according to various embodiments of the disclosure. Each block in the flow chart or the block diagram may represent a module, a program segment, or a part of codes. The module, the program segment or the part of codes contains one or more executable instructions for implementing specified logical functions. It should be noted that, in some alternative implementations, the functions noted in the blocks may also occur in an order different from those noted in the accompanying drawings. For example, two consecutive blocks may actually be executed in substantially parallel, and sometimes may be executed in a reverse order, which depends on the functions involved. It should also be noted that, each block in the block diagram and/or the flow chart, and the combination of blocks in the block diagram and/or the flow chart, may be implemented with a dedicated hardware-based system for performing specified functions or actions, or may be implemented with a combination of dedicated hardware and computer instructions.

The modules described in embodiments of the disclosure may be implemented by software or hardware. A name of the module does not constitute a limitation of the module itself in some cases. For example, module A can may be described as "module A for performing B operation".

The above description is only a preferable embodiment of the disclosure and explanation of an applied technical principle. It should be understood by the skilled in the art that, a disclosure scope involved in the disclosure is not limited to a technical solution formed by a specific combination of the above technical features, but also covers other technical solutions formed by any combination of the above technical features or their equivalent features without departing from the concept of the above disclosure, such as a technical solution formed by replacing the above features with (but not limited to) technical features with similar functions disclosed in the disclosure.

The invention claimed is:

1. A communication method, performed by a sensing responder, comprising:

determining a sensing measurement report frame, wherein the sensing measurement report frame comprises a control field, the control field comprises a first identification bit, and the first identification bit indicates a wireless local area network (WLAN) sensing measurement process corresponding to the sensing measurement report frame; and sending the sensing measurement report frame.

2. The communication method of claim 1, wherein the first identification bit comprises a sensing measurement exchange identification comprised in the WLAN sensing measurement process.

3. The communication method of claim 2, wherein the first identification bit further comprises a sensing measurement setup identification comprised in the WLAN sensing measurement process, wherein the sensing measurement setup identification corresponds to the sensing measurement exchange identification.

4. The communication method of claim 1, wherein the control field comprises a sounding dialog token number subfield;

the first identification bit is carried in the sounding dialog token number subfield.

5. The communication method of claim 1, wherein the control field further comprises at least one of:

a bandwidth (BW) parameter subfield, a format subfield or a type subfield, a first index information subfield for a number of spatial streams (NSS) or a number of spatial stream total (NST), or a byte information bit subfield.

6. The communication method of claim 5, wherein, the format subfield or the type subfield indicates that the WLAN sensing measurement process is applied to multiple users, the control field further comprises a second index information subfield for a resource unit (RU).

7. The communication method of claim 1, wherein the control field further comprises a remaining report segment subfield; and the remaining report segment subfield indicates a measurement report result to be transmitted.

8. The communication method of claim 1, wherein the sensing measurement report frame is an action frame.

9. The communication method of claim 8, wherein the action frame comprises an action field;

the action field comprises a second identification bit or a third identification bit;

the second identification bit indicates that the action frame is a measurement report frame; and the third identification bit indicates that the action frame is a non-triggered based (Non-TB) measurement report frame or a TB measurement report frame.

10. An electronic device, comprising: a memory, a processor, and a computer program stored in the memory and operated in the processor, wherein the processor is configured to execute the computer program to implement:

determining a sensing measurement report frame, wherein the sensing measurement report frame comprises a control field, the control field comprises a first identification bit, and the first identification bit indicates a wireless local area network (WLAN) sensing measurement process corresponding to the sensing measurement report frame; and sending the sensing measurement report frame.

11. A communication method, performed by a sensing initiator, comprising:

receiving a sensing measurement report frame, wherein the sensing measurement report frame comprises a control field, the control field comprises a first identification bit, and the first identification bit indicates a wireless local area network (WLAN) sensing measurement process corresponding to the sensing measurement report frame.

12. The communication method of claim 11, wherein the first identification bit comprises a sensing measurement exchange identification comprised in the WLAN sensing measurement process.

13. The communication method of claim 12, wherein the first identification bit further comprises a sensing measurement setup identification comprised in the WLAN sensing measurement process, wherein the sensing measurement setup identification corresponds to the sensing measurement exchange identification.

14. The communication method of claim 11, wherein the control field comprises a sounding dialog token number subfield;

the first identification bit is carried in the sounding dialog token number subfield.

15. The communication method of claim 11, wherein the control field further comprises at least one of:

a bandwidth (BW) parameter subfield, a format subfield or a type subfield, a first index information subfield for a number of spatial streams (NSS) or a number of spatial stream total (NST), or a byte information bit subfield.

16. The communication method of claim 15, wherein, the format subfield or the type subfield indicates that the WLAN sensing measurement process is applied to multiple users, the control field further comprises a second index information subfield for a resource unit (RU).

17. The communication method of claim 11, wherein the control field further comprises a remaining report segment subfield; and the remaining report segment subfield indicates a measurement report result to be transmitted.

18. The communication method of claim 11, wherein the sensing measurement report frame is an action frame.

19. The communication method of claim 18, wherein the action frame comprises an action field;

the action field comprises a second identification bit or a third identification bit;

the second identification bit indicates that the action frame is a measurement report frame; and the third identification bit indicates that the action frame is a non-triggered based (Non-TB) measurement report frame or a TB measurement report frame.

20. An electronic device, comprising: a memory, a processor, and a computer program stored in the memory and operated in the processor, wherein the processor is configured to execute the computer program to implement the method according to claim 11.

* * * * *